(12) United States Patent
Miura et al.

(10) Patent No.: US 6,996,837 B1
(45) Date of Patent: Feb. 7, 2006

(54) TERMINAL EQUIPMENT FOR CABLE TELEVISION

(75) Inventors: Takeshi Miura, Tokyo (JP); Nobuo Uee, Tokyo (JP); Mitsuru Nishitsuka, Tokyo (JP)

(73) Assignee: Pioneer Corporation, Tokyo (JP)

( * ) Notice: Subject to any disclaimer, the term of this patent is extended or adjusted under 35 U.S.C. 154(b) by 715 days.

(21) Appl. No.: 09/639,085

(22) Filed: Aug. 16, 2000

(30) Foreign Application Priority Data

Aug. 27, 1999 (JP) .................................. 11-240994

(51) Int. Cl.
*H04N 7/18* (2006.01)
(52) U.S. Cl. ......................... 725/78; 725/80; 725/81; 725/85; 725/133; 725/141; 725/153
(58) Field of Classification Search ................. 728/78, 728/80–82, 85, 139, 133, 141; 715/153
See application file for complete search history.

(56) References Cited

U.S. PATENT DOCUMENTS

| | | | | | |
|---|---|---|---|---|---|
| 4,485,370 | A | * | 11/1984 | Poisel ........................ 338/309 |
| 4,916,532 | A | * | 4/1990 | Streck et al. ................ 348/723 |
| 5,636,211 | A | * | 6/1997 | Newlin et al. .............. 370/465 |
| 5,715,020 | A | * | 2/1998 | Kuroiwa et al. ............ 348/734 |
| 5,727,053 | A | * | 3/1998 | Sizer II et al. ......... 379/142.01 |
| 5,737,030 | A | * | 4/1998 | Hong et al. .................. 725/41 |
| RE35,954 | E | * | 11/1998 | Levine ........................ 380/10 |
| 5,862,219 | A | * | 1/1999 | Glaab ......................... 380/210 |
| 6,137,539 | A | * | 10/2000 | Lownes et al. ............. 348/569 |
| 6,202,211 | B1 | * | 3/2001 | Williams, Jr. ................ 725/78 |
| 6,363,434 | B1 | * | 3/2002 | Eytchison .................... 719/313 |
| 6,452,935 | B1 | * | 9/2002 | Gibbs ......................... 370/439 |
| 6,493,874 | B2 | * | 12/2002 | Humpleman ................. 725/78 |
| 6,529,556 | B1 | * | 3/2003 | Perdue et al. ............... 375/260 |
| 6,542,882 | B1 | * | 4/2003 | Smith ........................... 706/46 |
| 6,678,008 | B1 | * | 1/2004 | Winter ........................ 348/565 |
| 6,684,401 | B1 | * | 1/2004 | Zou ............................ 725/80 |

FOREIGN PATENT DOCUMENTS

| | | |
|---|---|---|
| CN | 96210241.5 | 3/1998 |
| GB | 2 331 650 A | 5/1999 |

OTHER PUBLICATIONS

Abstract Only of Japanese Patent Application JP 09298677, Abe Fuyuki, Nov. 18, 1997.

* cited by examiner

*Primary Examiner*—John Miller
*Assistant Examiner*—Annan Shang
(74) *Attorney, Agent, or Firm*—Arent Fox, PLLC

(57) ABSTRACT

Terminal equipment has a master terminal (1) and a slave terminal (2), the master terminal (1) includes a first tuner (TA) receiving the cablecast signal for television programming delivered from the cable television station, and applying an image signal produced from the cablecast signal to a first television receiver (3); a second tuner (TB) receiving a cablecast signal, and applying an image signal produced from the cablecast signal; and a transmitter/receiver (RT) radio-transmitting the image signal output from the second tuner section, the slave terminal (2) includes a radio-receiving section for receiving the image signal transmitted from the transmitter/receiver (RT) of the master terminal (1), and applying the image signal, received by the radio-receiving section, to a second television receiver (5).

3 Claims, 3 Drawing Sheets

TERMINAL EQUIPMENT FOR CABLE TELEVISION

BACKGROUND OF THE INVENTION

1. Field of the Invention

The invention relates to terminal equipment for receiving television programming delivered from a cable television station to display on a television screen in a cable television cablecasting system.

2. Described of the Related Art

Recent years have seen a proliferation of cable televisions (CATV) delivering television programming through cables in conjunction with the diversification of multimedia.

This CATV is a system for delivering television programming on a predetermined image frequency channel from a cable television station to each terminal that is located at a house of a subscriber in the service area and connected to the cable television station through coaxial cable.

With such CATV system, if in a house providing for a terminal a subscriber desires to watch particular programs on a plurality of television receivers or to record a different program broadcast in the same time slot on a video tape, it is conventionally needed to provide for a plurality of terminals each of which is connected to the cable television station.

This causes problems such as wiring for coaxial cable in the house increases in complexity and watching of CAVT is difficult in a room having no connector for access to the cable television station.

SUMMARY OF THE INVENTION

The present invention has been made to solve the above problems associated with the conventional CATV.

It is therefore an object of the present invention to achieve with only one terminal to watch a program and simultaneously either record another program or watch other programs on a plurality of television receivers, and to watch television receivers located in respectively different rooms without any inconvenience accompanying the wiring of coaxial cable.

To attain the object, terminal equipment for cable television according to a first invention is terminal equipment connected to a cable television station to receive a cablecast signal for television programming delivered from the cable television station, being characterized by a master terminal and at least one slave terminal, in that the master terminal includes: a first tuner section for receiving a cablecast signal for television programming delivered from the cable television station, and applying an image signal produced from the cablecast signal to a first television receiver; at least one second tuner section for receiving a cablecast signal for television programming delivered from the cable television station, and applying an image signal produced from the cablecast signal; and a radio-transmitter section connected to the second tuner section to radio-transmit the image signal output from the second tuner section, and in that the slave terminal includes a radio-receiving section for receiving the image signal transmitted from the radio-transmitter section of the master terminal, and applying the image signal received by the radio-receiving section to a second television receiver.

With the terminal equipment for cable television according to the first invention, the first tuner section and the second tuner section for the slave terminal, which are provided in the master terminal, are connected to the cable television station, to receive the respective cablecast signals for programs transmitted from the cable television station.

The cablecast signal received by the first tuner section is processed in the first tuner section to produce a required image signal, which is then applied to the first television receiver connected to the master terminal.

The slave terminal is connected to the second television receiver located in, for example, another room at some distance from the master terminal.

The cablecast signal received by the second tuner section in the master terminal is processed therein to produce a required image signal, which is then radio-transmitted from the radio-transmitter section, then received by the radio-receiving section of the slave terminal, and then applied to the second television receiver connected to the slave terminal.

According to the foregoing first invention, it is possible to achieve with only one terminal equipment that various programs can be watched on a plurality of television receivers at various locations at some distance from each other without inconvenient wiring.

The terminal equipment for cable television according to a second invention, as set forth in the first invention, includes a signal distributor distributing the cablecast signal delivered from the cable television station. The cablecast signals distributed by the signal distributor are input to the first tuner section and the second tuner section.

Specifically, the signal distributor applies the cablecast signal, delivered from the cable television station, to each of the first tuner section and the second tuner section at a proper output.

In the terminal equipment for cable television according to a third invention, as set forth in the first invention, the first tuner section has a controller controlling operations of the first tuner section and the second tuner section.

The single controller provided in the first tuner section has control over a plurality of tuner sections, such as the first and second tuner sections, provided in the master terminal.

In the terminal equipment for cable television according to a fourth invention, as set forth in the first invention, the second tuner section has a selector subsection for switching between a terminal connected to a picture-recording device and the radio-transmitter section to apply the image signal to the terminal or the radio-transmitter section.

Thus, the image signal from the second tuner section is applied to either the radio-transmitter section or the picture-recording device connected to the master terminal by switching of the selector subsection provided in the second tuner section. This allows a viewer to selectively switch to record a program with the picture-recording device or to watch a program on a television receiver connected to the slave terminal, while watching another program on another television receiver connected the master terminal.

The terminal equipment for cable television according to a fifth invention, as set forth in the first invention, includes a message signal outputting section which outputs a message signal for displaying a selecting state of the selector subsection on the second television receiver to transmit the message signal through the radio-transmitter section to the slave terminal, when the selector subsection is switched to supply the image signal from the second tuner section to the picture-recording device.

With this terminal equipment, the picture-recording device is connected to the second tuner of the master terminal through the selector section. When the selector subsection is switched to send the image signal from the second tuner section to the picture-recording device, the message signal is output from the message signal outputting section, and then transmitted from the radio-transmitter section to the slave terminal, resulting in the message displayed on the second television receiver's screen.

From this message, the viewer who attempts to watch programming on the second television receiver can readily see that the image signal is being not supplied from the master terminal to the slave terminal, and that the viewer cannot watch any program on the second television receiver.

In the terminal equipment for cable television according to a sixth invention, as set forth in the third invention, the controller switches a selector subsection of the second tuner section in response to a manipulation signal input thereto, to supply the image signal from the second tuner section to the radio-transmitter section or a terminal connected to a picture-recording device.

The single controller provided in the first tuner section thus controls the switching of the selector subsection in the second tuner section. This results in changing the output direction of the image signal from the second tuner so as to select between the recording operation by the picture-recording device and the viewing operation for programming by the second television receiver connected to the slave terminal.

In the terminal equipment for cable television according to a seventh invention, as set forth in the first invention, the second tuner section includes a scramble information detector subsection for detecting scramble information from the cablecast signal transmitted from the cable television station to the second tuner section, the scramble information detected by the scramble information detecting subsection being used to descramble the scrambled cablecast signal input to the second tuner section.

For this configuration, even when the cablecast signal transmitted from the CATV station is scrambled, recording programming with the picture-recording device or watching programming on the second television receiver connected the slave terminal can be achieved with the image signal output from the second tuner section.

In the terminal equipment for cable television according to a eighth invention, as set forth in the third invention, a scramble information detector subsection provided in the second tuner section detects scramble information from the cablecast signal input to the second tuner section, and applies the detected scramble information to the controller of the first tuner section to allow the controller to descramble the scrambled cablecast signal applied to the second tuner section.

For this configuration, even when the cablecast signal from the CATV station is scrambled, the single controller provided in the first tuner section can descramble the scrambled cablecast signal input to the second tuner section. This results in achieving with the image signal output from the second tuner section to record programming with the picture-recording device or watch programming on the second television receiver connected the slave terminal.

In the terminal equipment for cable television according to a ninth invention, as set forth in the first invention, the slave terminal includes a radio-transmitting section for radio-transmitting a control signal for controlling the operation of the second tuner section, and the second tuner section is connected to a radio-receiver section for receiving the control signal transmitted from the radio-transmitting section of the slave terminal, and a controller controlling the operation of the second tuner section in response to the control signal received by the radio-receiver section.

With the terminal equipment for cable television according to the ninth invention, in the case where the operation control of the second tuner section, such as in selecting a TV channel, adjusting volume and so on, is produced in the slave terminal, the control signal is sent from a remote controller or the like to the slave terminal, and then transmitted from the radio-transmitting section of the slave terminal to be received by the radio-receiver section of the master terminal.

The controller connected to the second tuner section controls the requested operation of the second tuner section in response to the received control signal.

In the terminal equipment for cable television according to a tenth invention, as set forth in the ninth invention, the aforementioned radio-receiver section is provided in the transmitter section of the master terminal.

This allows the reception of the control signal from the slave terminal into the master terminal with the common use of components, such as an antenna, provided in the radio-transmitter section of the master terminal.

In the terminal equipment for cable television according to an eleventh invention, as set forth in the ninth invention, the controller is provided in the first tuner section and serves as a controller controlling operations of the first tuner section and the second tuner section.

This allows the single controller in the first tuner section to control the operations, such as in changing the TV channel or controlling volumes, for the second television receiver connected to the slave terminal.

In the terminal equipment for cable television according to a twelfth invention, as set forth in the ninth invention, the control signal is a TV channel selection signal for an image signal to be applied to the second television receiver.

Since the TV channel of the image signal transmitted from the master terminal can be set through the slave terminal, there is less inconvenience since the viewer does not have to go to the master terminal to set the desired TV channel every time.

In the terminal equipment for cable television according to a thirteenth invention, as set forth in the ninth invention, the control signal is a volume control signal for an image signal to be applied to the second television receiver.

Since a volume of the image signal transmitted from the master terminal can be adjusted through the slave terminal, there is less inconvenience since the viewer does not have to go to the master terminal to adjust the volume every time.

In the terminal equipment for cable television according to a fourteenth invention, as set forth in the first invention, the slave terminal further includes a remote controller receiving section for receiving a remote control signal supplied from a wireless remote controller.

This allows the wireless operation control, such as in changing the TV channel or adjusting volume, for the second television receiver connected to the slave terminal using the remote controller.

These and other objects and advantages of the present invention will become obvious to those skilled in the art upon review of the following description, the accompanying drawings and appended claims.

DETAILED DESCRIPTION OF THE PREFERRED EMBODIMENT

A preferred embodiment according to present invention will be described below in detail with reference to the accompanying drawings.

Figure 1:
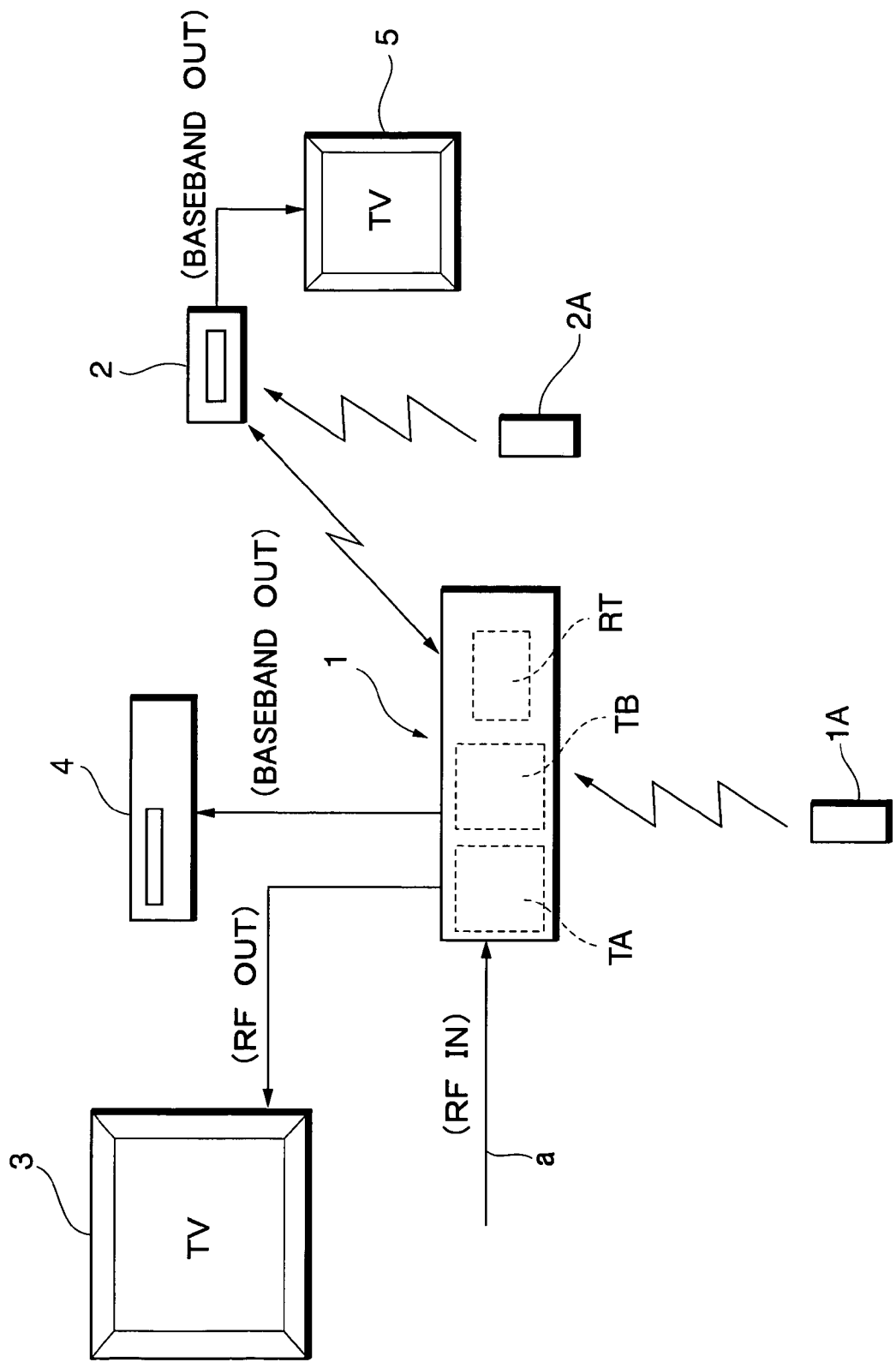
FIG. 1 is a block diagram of system showing an example of an embodiment of a CATV system using terminal equipment for CATV according to the present invention.

FIG. 1 is a block diagram of system showing an example of the embodiment of a CATV system using terminal equipment for CATV of the present invention.

In FIG. 1, a master terminal 1 of the terminal equipment includes two tuners of a first tuner TA and a second tuner TB, and a transmitter/receiver RT connected to the second tuner TB. In addition, a slave terminal 2 is provided for radio-communication with the transmitter/receiver RT.

For the master terminal 1, a main remote controller 1A is provided for channel manipulations, volume control and so on, while for the slave terminal 2, a sub remote controller 2A is provided for channel manipulations, volume control and so on.

The master terminal 1 is connected through a delivering cable a to a cable television station (not shown). The first tuner TA of the master terminal 1 is connected to a first television receiver 3, and the second tuner TB is connected to a video recorder (referred as "VTR" hereinafter) 4.

Note that the slave terminal 2 is connected to a second television receiver 5.

Figure 2:
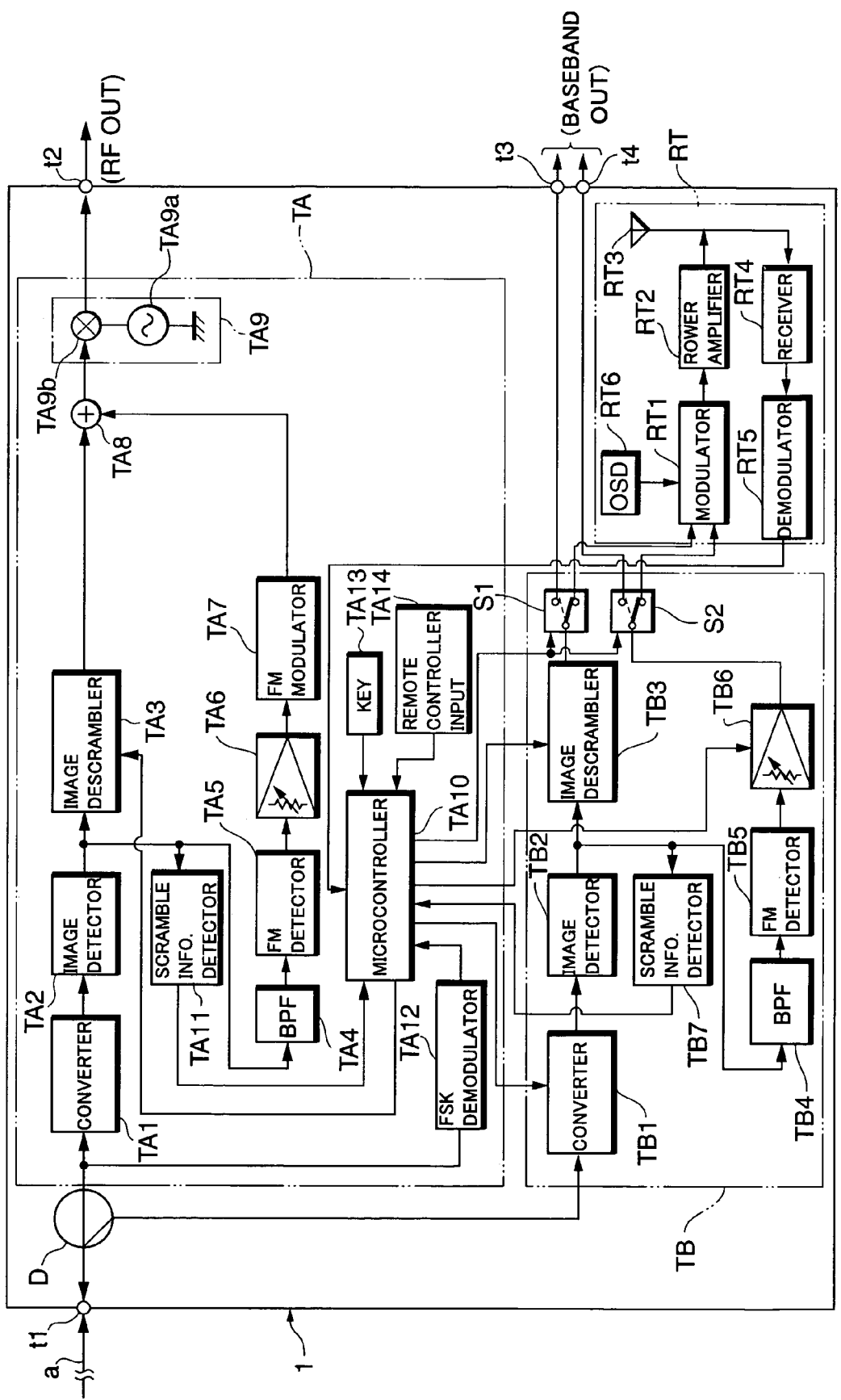
FIG. 2 is a block diagram showing an example of an embodiment for a master terminal of the terminal equipment for CATV according to the present invention.

FIG. 2 is a block diagram showing configuration of the master terminal 1.

In FIG. 2, the master terminal 1 is provided with the first tuner TA, the second tuner TB and the transmitter/receiver RT as explained above.

The first tuner TA is provided with: a converter TA1 for frequency-converting a radio-frequency band signal (RF input) transmitted from the cable television station through the delivering cable a to a connection terminal t1, then a distributor D, and then to the converter TA1; an image detector circuit TA2 image-detecting the signal which has been frequency-converted by the converter TA1; an image descrambler circuit TA3 descrambling the scrambled image signal which has been image-detected by the image detector circuit TA2; a band pass filter (referred as "BPF" hereinafter) TA4 extracting sound carrier wave from the image signal which is received from the image detector circuit TA2; an FM detector circuit TA5 FM-detecting the extracted sound carrier wave; a audio amplifier circuit TA6 amplifying the sound signal which has been FM-detected by the FM detector circuit TA5; and an FM modulator circuit TA7 FM-modulating the amplified sound signal.

The first tuner TA is further provided with: a combiner TA8 for combining the image signal which has been descrambled by the image descrambler circuit TA3, with the sound signal which has been FM-modulated by the FM modulator circuit TA7; and a modulator TA9 composed of a local oscillator TA9$a$ and a mixer TA9$b$, and AM-modulating the combined signal supplied from the combiner TA8, to produce a TV channel signal (RF output) of a defined frequency. The TV channel signal (RF output) modulated by the modulator TA9 is applied through an output terminal t2 to the first television receiver 3 (FIG. 1) connected thereto.

In addition, the first tuner TA incorporates a microcontroller TA10 which is connected to a scramble information detector circuit TA11 detecting scramble information from the image signal which is output from the image detector circuit TA2; an FSK demodulator circuit TA12 demodulating the scramble information from an FSK signal transmitted out-of-band from the CATV station; a key input circuit TA13; and a remote controller input circuit TA14.

The microcontroller TA10 is connected to the image descrambler circuit TA3, which is designed to control the descrambling operation in the image descrambler circuit TA3 according to the scramble information supplied from the scramble information detector circuit TA11 or the FSK modulator circuit TA12.

The microcontroller TA10 further serves as a controller controlling the operation of the second tuner TB as will be described hereinafter.

The second tuner TB is provided with: a converter TB1 for frequency-converting a radio-frequency band signal (RF input) which is transmitted from the CAVT station and then distributed to the converter TB1 by the distributor D; an image detector circuit TB2 image-detecting the signal frequency-converted by the converter TB1; an image descrambler circuit TB3 descrambling the scrambled image signal detected by the image detector circuit TB2; a band pass filter (BPF) TB4 extracting sound carrier wave from the image signal received from the image detector circuit TB2; an FM detector circuit TB5 FM-detecting the resulting sound carrier wave; a audio amplifier circuit TB6 amplifying the sound signal FM-detected by the FM detector circuit TB5; and a scramble information detector circuit TB7 detecting scramble information from the image signal which is output from the image detector circuit TB2, which is connected to the microcontroller TA10 of the first tuner TA.

In turn, the image descrambler circuit TB3 of the second tuner TB is connected to a first selection switch S1 switching between an output terminal t3 connected to the VTR 4 and the transmitter/receiver RT to send the image signal (baseband output) from the image descrambler circuit TB3 to the output terminal t3 or the transmitter/receiver RT, while the audio amplifier circuit TB6 is connected to a second selection switch S2 switching between an output terminal t4 connected to the VTR 4 and the transmitter/receiver RT to send the sound signal (baseband output) from the audio amplifier circuit TB6 to the output terminal t4 or the transmitter/receiver RT.

The microcontroller TA10 of the first tuner TA is connected to the converter TB1, image descrambler circuit TB3, audio amplifier circuit TB6, first selection switch S1 and second selection switch S2 of the second tuner TB to input: a later-described channel selecting signal to the converter TB1; a descrambling signal to the image descrambler circuit TB3; and a later-described switching signal to each of the first and second selection switches S1, S2.

The transmitter/receiver RT includes: a modulator circuit RT1 connected to the first selection switch S1 and the second selection switch S2 to receive the image signal (baseband output) and the sound signal (baseband output) from the first and second selection switches S1, S2 under connection to the transmitter/receiver RT; a power amplifier circuit RT2 amplifying the modulated signal having the carrier modulated by the modulator circuit RT1, for radio-transmission; an antenna RT3 transmitting the modulated signal supplied from the power amplifier circuit RT2, and receiving a remote control signal transmitted from the slave terminal 2 which will be described later; a receiver circuit RT4 receiving the remote control signal, transmitted from the slave terminal 2, from the antenna RT3; a demodulator circuit RT5 demodulating the remote control signal received by the receiver circuit RT4 and inputting it to the microcontroller TA10 of the first tuner TA; and an on-screen display (OSD) RT6 connected to the modulator circuit RT1 to send a message signal to the modulator circuit RT1 in response to a later-described command signal supplied the microcontroller TA10.

Figure 3:
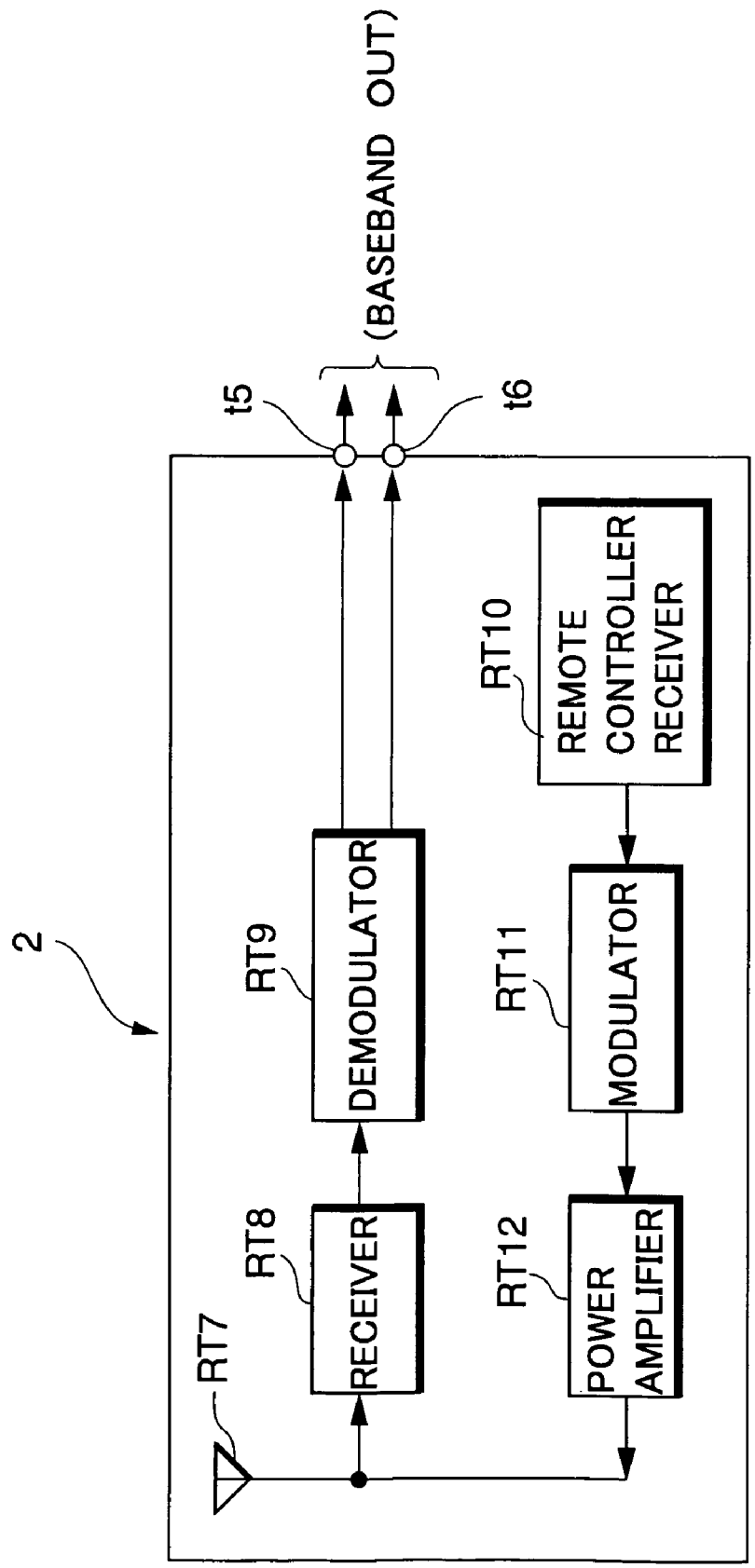
FIG. 3 is a block diagram showing an example of an embodiment of a slave terminal of the terminal equipment for CATV of the above example.

FIG. 3 is a block diagram showing configuration of the slave terminal 2.

In FIG. 3, the slave terminal 2 includes an antenna RT7, a receiving circuit RT8 carrying out the reception from the master terminal 1 through the antenna RT7, and a demodulator circuit RT9 demodulating the modulated signal received from the master terminal 1 by the receiving circuit. RT8. The image signal (baseband output) and the sound signal (baseband output) that have been demodulated by the demodulator circuit RT9 are supplied from the respective output terminals t5, t6 to the second television receiver 5.

In addition, the slave terminal 2 includes a remote controller receiving circuit RT10 receiving a remote control signal supplied from the sub remote controller 2A (FIG. 1); a modulator circuit RT11 modulating the remote control signal received by the remote controller receiving circuit RT10; and a power amplifier circuit RT12 amplifying the modulated signal from the modulator circuit RT11 for transmission from the antenna RT7.

Next, the explanation will be made for operation of the aforementioned terminal equipment for cable television.

The terminal equipment has access to the CATV station since the connection terminal t1 is connected to the delivering cable a wired into an ordinary household.

With the terminal equipment, the first tuner TA receives from the distributor D a radio-frequency band signal (RF input) which is delivered from the CATV station through the delivering cable a.

The incoming radio-frequency band signal (RF input) is input to the converter TA1 of the first tuner TA, which is frequency-converted by the converter TA1, then image-detected by the image detector circuit TA2, and then applied to the image descrambler circuit TA3.

On the other hand, an FSK signal transmitted via out-of-band from the CATV station is input to the FSK demodulator circuit TA12. The scramble information demodulated by the FSK demodulator circuit TA12 is sent to the microcontroller TA10. The microcontroller TA10 outputs a signal for the descrambling in the image descrambler circuit TA3 according to the scramble information supplied from the scramble information detector circuit TA11 or the FSK modulator circuit TA12.

The image descrambler circuit TA3 descrambles the detected image signal received from the image detector circuit TA2 in response to the descrambling signal received from the microcontroller TA10, and applies the descrambled image signal to the combiner TA8.

Meanwhile, the image signal is supplied from the image detector circuit TA2 to the BPF TA4 at which sound carrier wave is extracted from the image signal. The resulting sound carrier wave is then FM-detected by the FM detector circuit TA5.

After that, the sound signal FM-detected by the FM detector circuit TA5 is amplified by the audio amplifier circuit TA6. The amplified sound signal is then FM-modulated by the FM modulator circuit TA7, and then applied to the combiner TA8.

The combiner TA8 combines the descrambled image signal received from the image descrambler circuit TA3 and the FM-modulated sound signal from the FM modulator circuit TA7, and then applies the combined signal to the modulator TA9. The modulator TA9 AM-modulates the combined signal received from the combiner TA8, to produce a TV channel signal (RF output) of a defined frequency, and then applies the resulting signal to the first television receiver 3 through the output terminal t2.

With the second tuner TB, similar to the case of the first tuner TA, a radio-frequency band signal (RF input) transmitted from the CATV station is applied to the converter TB1 after being distributed by the distributor D.

The radio-frequency band signal (RF input) is then frequency-converted by the converter TB1, then image-detected by the image detector circuit TB2, and then applied to the image descrambler circuit TB3.

In the image descrambler circuit TB3, the detected image signal received from the image detector circuit TB2 is descrambled in response to a descrambling signal that is supplied from the microcontroller TA10 of the first tuner TA according to the scramble information detected by the scramble information detector circuit TB7. The descrambled image signal (baseband output) is applied to the first selection switch S1.

Meanwhile, the image signal is supplied from the image detector circuit TB2 to the BPF TB4 at which sound carrier wave is extracted from the image signal. The resulting sound carrier wave is then FM-detected by the FM detector circuit TB5, then the sound signal (baseband output) FM-detected in the FM detector circuit TB5 is amplified by the audio amplifier circuit TB6, and applied to the second selection switch S2.

In the recording operation of the VTR 4, the first selection switch S1 and the second selection switch S2 are supplied with a TV/video selection signal from the main remote controller 1A through the remote controller input circuit TA14 and the microcontroller TA10, and then they are shifted in response to the TV/video selection signal to output the image signal (baseband output) and the sound signal (baseband output) to the output terminals t3, t4, respectively.

Thus, the image signal (baseband output) and the sound signal (baseband output) are directed from the output terminals t3, t4 to the VTR 4 for recording therein.

On the other hand, in watching the second television receiver 5, the first selection switch S1 and the second selection switch S2 are shifted in response to the TV/video selection signal to apply the image signal (baseband output) and the sound signal (baseband output) to the transmitter/receiver RT.

The image signal (baseband output) and the sound signal (baseband output) are supplied from the second tuner TB input to the modulator circuit RT1, to be modulated onto the carrier, by switching the first selection switch S1 and the second selection switch S2. The thus modulated signal is amplified by the power amplifier circuit RT2 for radio-transmission from the antenna RT3 to the slave terminal 2.

The amplified signal is transmitted from the transmitter/receiver RT to the receiving circuit RT8 through the antenna RT7 of the slave terminal 2. Subsequently, this modulated signal supplied from the second tuner TB of the master terminal 1 is demodulated by the demodulator circuit RT9.

The thus demodulated image signal (baseband output) and sound signal (baseband output) are applied from the respective output terminals t5, t6 to the second television receiver 5, resulting in televising of programming.

With the slave terminal 2, when selection of TV channels or volume control is instructed through the sub remote controller 2A, a remote control signal is supplied from the sub remote controller 2A to the remote controller receiving circuit RT10, and then modulated by the modulator circuit RT11, then amplified by the power amplifier circuit RT12, and then transmitted from the antenna RT7 toward the master terminal 1.

After the remote control signal transmitted from the slave terminal 2 is received through the antenna RT 3 by the receiver circuit RT4 of the transmitter/receiver RT of the master terminal 1, it is demodulated by the demodulator circuit RT5 and then input to the microcontroller TA10 of the first tuner TA.

When the remote control signal supplied from the slave terminal 2 through the transmitter/receiver RT is a TV channel selection signal, the microcontroller TA10 sends the TV channel selection signal to the converter TB1 of the second tuner TB.

The converter TB1 after receiving the TV channel selection signal tunes to a frequency of the selected TV channel, resulting in the selection of TV channel.

When the remote control signal supplied from the slave terminal 2 through the transmitter/receiver RT is a volume control signal, the microcontroller TA10 sends the volume control signal to the audio amplifier circuit TB6 of the second tuner TB.

The audio amplifier circuit TB6 after receiving the volume control signal changes an amplification factor of the sound signal to a desired value, resulting in volume control.

Note that when the first selection switch S1 and the second selection switch S2 are shifted to the VTR 4 to output the image signal (baseband output) and the sound signal (baseband output), a display signal is supplied from the microcontroller TA10 to the OSD (On-Screen Display) RT6. In response to the display signal, the OSD RT6 applies a message signal for displaying, e.g. "recording" to the modulator circuit RT1.

The message signal is transmitted through the modulator circuit RT1, the power amplifier circuit RT2 and the antenna RT3 to the slave terminal 2. After reception by the slave terminal 2, the message signal is sent through the antenna RT7, the receiving circuit RT8 and the demodulator circuit RT9 to the second television receiver 5. Thus displaying the message "recording" on the screen of the second television receiver 5.

Therefore, if the viewer desires to watch a program of the CATV on the second television receiver 5, the message makes the viewer aware of the impossibilities of watching any program on the second television receiver 5 since the second tuner TB of the master terminal 1 is used for recording a program.

It should be mentioned that the foregoing description has been made for the example when the master terminal 1 consists of a called double tuner, but a tuner having the same configuration as that of the second tuner TB may be additionally provided to increase the number of slave terminals or the number of connected VTRs 4.

The terms and description used herein are set forth by way of illustration only and are not meant as limitations. Those skilled in the art will recognize that numerous variations are possible within the spirit and scope of the invention as defined in the following claims.

The invention claimed is:

1. Terminal equipment connected to a cable television station of cable television to receive a cablecast signal for television programming delivered from the cable television station, comprising:
   a master terminal including a first tuner section for receiving a cablecast signal for television programming delivered from the cable television station and applying an image signal produced from the cablecast signal to a first television receiver, at least one second tuner section for receiving a cablecast signal for television programming delivered from the cable television station and outputting an image signal produced from the cablecast signal, and a radio-transmitter section connected to said second tuner section to radio-transmit the image signal output from the second tuner section, wherein said second tuner section has a selector subsection for switching between a terminal connected to a picture-recording device and said radio-transmitter section to apply the image signal to the terminal or said radio-transmitter section;
   at least one slave terminal including a radio-receiving section for receiving the image signal transmitted from said radio-transmitter section of said master terminal, and applying the image signal received by said radio-receiving section to a second television receiver; and
   a message signal outputting section for outputting a message signal for displaying a selecting state of said selector subsection on the second television receiver, to transmit the message signal through said radio-transmitter section to said slave terminal, the message signal indicating that the image signal is prevented from being transmitted when the selector subsection is switched to send the image signal from said second tuner section to the picture-recording device.

2. The terminal equipment for cable television according to claim 1, wherein said controller switches the selector subsection of said second tuner section in response to a manipulation signal input thereto, to supply the image signal from said second tuner section to said radio-transmitter section or the terminal connected to the picture-recording device.

3. The terminal equipment for cable television according to claim 1, wherein said slave terminal further includes a remote controller receiving section for receiving a remote control signal supplied from a wireless remote controller.

* * * * *